United States Patent
You

(10) Patent No.: US 8,643,771 B2
(45) Date of Patent: Feb. 4, 2014

(54) ELECTRONIC DEVICE AND CONTROL METHOD FOR CONTROLLING POWERING-SAVING STATE OF ELECTRONIC DEVICE

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 250 days.

(21) Appl. No.: 13/313,169

(22) Filed: Dec. 7, 2011

(65) Prior Publication Data
US 2012/0274839 A1    Nov. 1, 2012

(30) Foreign Application Priority Data

Apr. 26, 2011  (CN) .......................... 2011 1 0104987

(51) Int. Cl.
*H04N 5/225* (2006.01)
*G06K 9/00* (2006.01)
*G09G 3/36* (2006.01)

(52) U.S. Cl.
USPC ............................ 348/372; 382/118; 345/102

(58) Field of Classification Search
USPC .................. 348/372; 382/103, 117–118, 181, 382/190–191; 345/102, 690; 455/574
See application file for complete search history.

(56) References Cited

U.S. PATENT DOCUMENTS

| | | | |
|---|---|---|---|
| 8,326,001 B2 * | 12/2012 | Free .............................. | 382/118 |
| 8,478,361 B2 * | 7/2013 | Pratt et al. .................... | 455/574 |
| 8,508,520 B2 * | 8/2013 | Porwal ......................... | 345/211 |
| 2005/0270252 A1 * | 12/2005 | Drader et al. ................. | 345/30 |
| 2007/0075965 A1 * | 4/2007 | Huppi et al. .................. | 345/156 |
| 2009/0082066 A1 * | 3/2009 | Katz ............................ | 455/566 |
| 2009/0160609 A1 * | 6/2009 | Lin et al. ..................... | 340/5.83 |
| 2009/0207121 A1 * | 8/2009 | Shih et al. .................... | 345/102 |
| 2010/0079508 A1 * | 4/2010 | Hodge et al. ................. | 345/697 |
| 2010/0117949 A1 * | 5/2010 | Lai et al. ..................... | 345/102 |
| 2010/0153764 A1 * | 6/2010 | Pratt et al. ................... | 713/324 |
| 2011/0006997 A1 * | 1/2011 | Porwal ......................... | 345/173 |
| 2011/0135114 A1 * | 6/2011 | Oba et al. ..................... | 381/107 |

* cited by examiner

*Primary Examiner* — Timothy J Henn
*Assistant Examiner* — Pritham Prabhakher
(74) *Attorney, Agent, or Firm* — Altis Law Group, Inc.

(57) ABSTRACT

An electronic device includes an image capturing unit and a processor. The processor controls the image capturing unit to periodically capture an image in front of the electronic device, and analyzes the captured image to determine whether a user is using the electronic device, and further controls the electronic device to be in a working state if a user is using the electronic device. A method for controlling an electronic device is also provided.

11 Claims, 3 Drawing Sheets

ELECTRONIC DEVICE AND CONTROL METHOD FOR CONTROLLING POWERING-SAVING STATE OF ELECTRONIC DEVICE

BACKGROUND

1. Technical Field

The present disclosure relates to an electronic device and a control method for the electronic device.

2. Description of Related Art

Electronic devices, for example, mobile phones, can automatically enter a power-saving mode (for example, turning off backlight modules), if it is not receiving operation signals within a predetermined time interval. This feature is sometimes an inconvenience when a user is reading a web page or an electronic book and the user did not enter any input within the predetermined time interval.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Embodiments of the present disclosure will now be described in detail with reference to the drawings.

Figure 1:
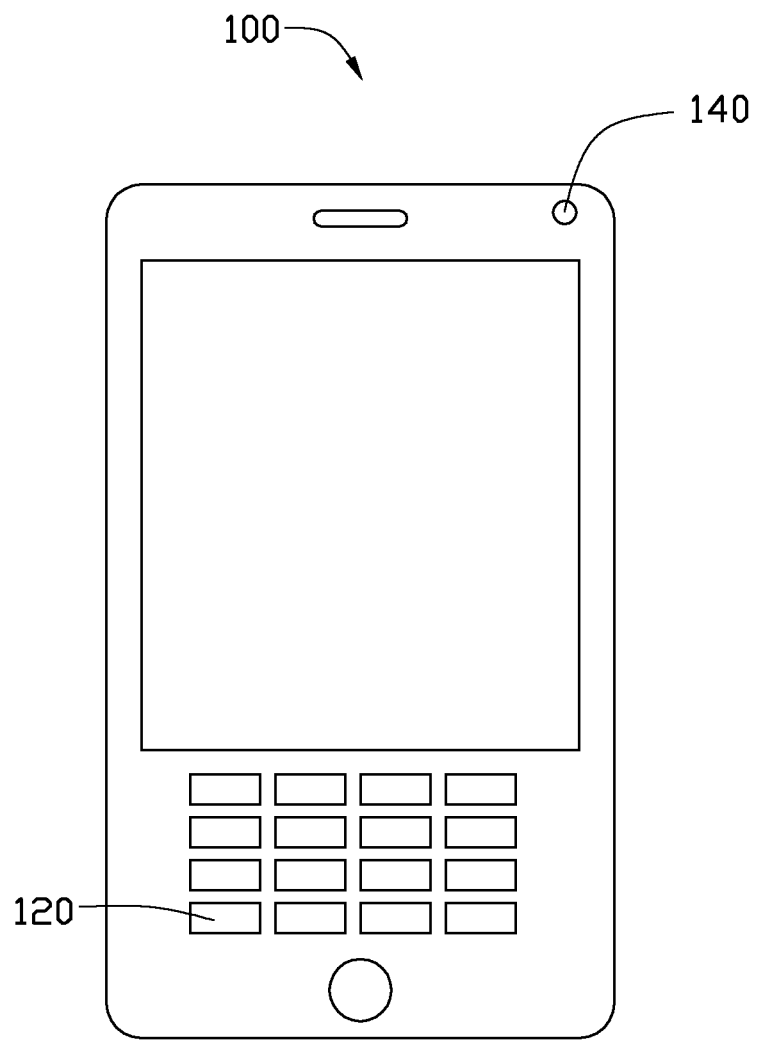
FIG. 1 is a schematic view of an electronic device in accordance with an embodiment.
Figure 2:
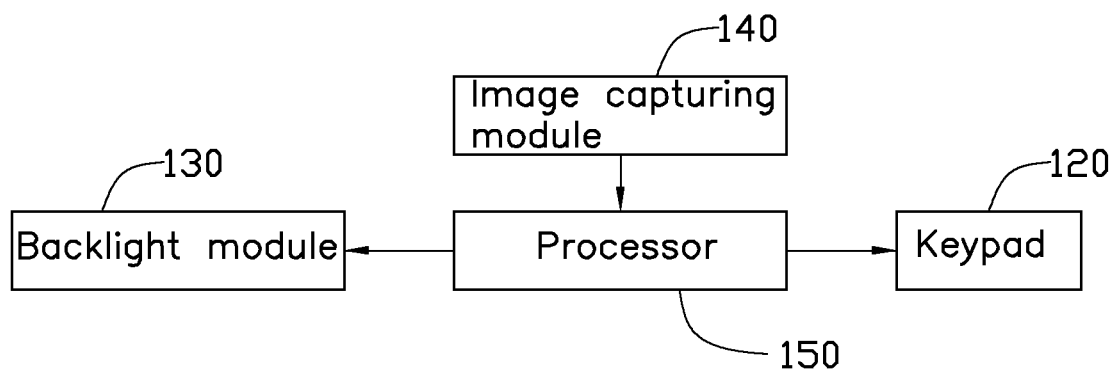
FIG. 2 is a block diagram of the electronic device of FIG. 1 in accordance with an embodiment.

Referring to FIGS. 1-2, an embodiment of an electronic device 100 is illustrated. The electronic device 100 includes a keypad 120, a backlight module 130, an image capturing module 140, and a processor 150. In this embodiment, the image capturing module 140 is arranged on a front of the device 100. The device 100 may be a mobile phone, an E-book reader, or the like.

The processor 150 controls the image capturing module 140 to periodically capture an image in front of the electronic device 100, and analyzes the captured image to determine whether a user is using the device 100. If a user is using the electronic device 100, the processor 150 controls the electronic device 100 to be in a working state. Otherwise, the processor 150 controls the electronic device 100 to be in a power-saving state. In the working state, the keyboard 120 is in an unlocked state, and the backlight module 130 is turned on. In the power-saving state, the keyboard 120 is in a locked state, and the backlight module 130 is turned off.

In this embodiment, the processor 150 compares the captured image with a pre-stored image to determine whether a difference between the captured image and the pre-stored image matches a preset value. If yes, the processor 150 determines that a user is using the electronic device 100. In this embodiment, the pre-stored image is a human face without eyes. If the difference matches the preset value, the processor 150 determines that the captured image includes eyes, and determines that a user is using the electronic device 100, thus, the processor 150 controls the electronic device 100 to be in a working state. If the processor 150 determines that a difference between each of the two images subsequently captured and the pre-stored image does not match the preset value, the processor 150 determines that no one is using the electronic device 100, and controls the electronic device 100 to be in a power-saving state. In an alternative embodiment, by using (for example) the facial recognition technology, the processor 150 determines whether any human facial feature is in the captured image. If the processor 150 determines that the captured image includes a human facial feature, the processor 150 determines that a user is using the electronic device 100, and controls the electronic device to be in a working state. Otherwise, the processor 150 determines that no one is using the electronic device 100, and controls the electronic device 100 to be in a power-saving state.

The electronic device 100 may include other components but not limited to the keypad 120 and the backlight module 130, which are to be in a working state while the electronic device 100 is in a working state, and is to be in a locked state while the electronic device being in a power-saving state.

Figure 3:
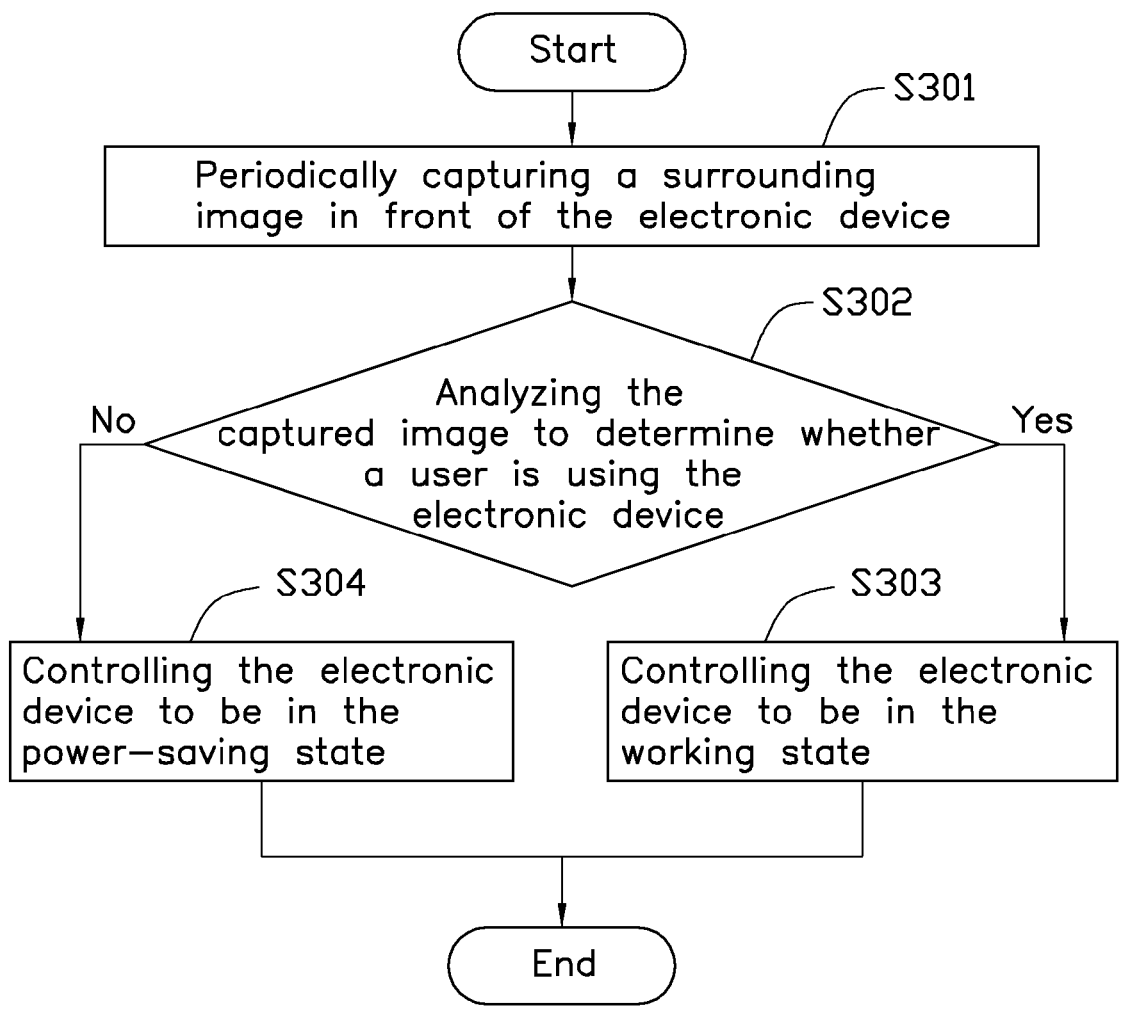
FIG. 3 is a method for controlling the electronic device of FIG. 1, in accordance with an embodiment.

FIG. 3 is a flowchart of a method for controlling the electronic device 100, in accordance with an embodiment.

In step S301, the processor 150 controls the image capturing unit 140 to periodically capture an image in front of the electronic device 100.

In step S302, the processor 150 analyzes the captured image to determine whether a user is using the electronic device 100. If a user is using the electronic device 100, the procedure goes to step S303, otherwise, the procedure goes to step S304.

In step S303, the processor 150 controls the electronic device 100 to be in the working state.

In step S304, the processor 150 controls the electronic device 100 to be in the power-saving state.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
   an image capturing unit; and
   a processor for controlling the image capturing unit to periodically capture an image in front of the electronic device, and analyzing the captured image to determine whether a user is using the electronic device, and further controlling the electronic device to be in a working state if a user is using the electronic device;
   wherein the processor compares the captured image with a pre-stored image to determine whether a difference between the captured image and the pre-stored image matches a preset value, and determine that a user is using the electronic device if the difference matches the preset value; wherein the pre-stored image is an image of a human face without eyes, if the difference matches the preset value, the processor determines that the captured image comprises eyes, and determine that a user is using the electronic device.

2. The electronic device as described in claim 1, wherein the processor further control the electronic device to be in a power-saving state if no one is using the electronic device.

3. The electronic device as described in claim 2, further comprising a keypad, wherein the keypad is in an unlocked state when the electronic device is in the working state, and is in a locked state when the electronic device is in the power-saving mode.

4. The electronic device as described in claim 2, further comprising a backlight module, wherein the backlight module is in an on state when the electronic device is in the working state, and in an off state when the electronic device is in the power-saving mode.

5. The electronic device as described in claim 1, wherein, the processor determine that no one is using the electronic device if the difference between the captured image and the pre-stored image does not match the preset value.

6. The electronic device as described in claim 1, wherein the processor determines whether a human facial feature is in the captured image, and determine that a user is using the electronic device if the captured image comprises a human facial feature, and determine that no one is using the electronic device if the captured image does not comprise a human facial feature.

7. The electronic device as described in claim 1, wherein the image capturing module is arranged on a front of the electronic device.

8. A method for controlling an electronic device, the electronic device comprising an image capturing module, the method comprising:
controlling the image capturing module to periodically capture an image in front of the electronic device;
analyzing the captured image to determine whether a user is using the electronic device; and
controlling the electronic device to be in a working state if a user is using the electronic device;
wherein the step of analyzing the captured image to determine whether a user is using the electronic device comprises:
comparing the captured image with a pre-stored image to determine whether a difference between the captured image and the pre-stored image matches a preset value; and
determining that a user is using the electronic device if the difference matches the preset value; and
wherein the pre-stored image is an image of a human face without eyes, if the difference matches the preset value, the captured image is determined to comprise eyes, and a user is determined to be using the electronic device.

9. The method as described in claim 8, further comprising:
controlling the electronic device to be in a power-saving state if no one is using the electronic device.

10. The method as described in claim 8, wherein the step of analyzing the captured image to determine whether a user is using the electronic device further comprises:
determining that no one is using the electronic device if the difference between the captured image and the pre-stored image does not match the preset value.

11. The method as described in claim 8, wherein the step of analyzing the captured image to determine whether a user is using the electronic device comprises:
analyzing the captured image to determine whether any human facial feature is in the captured image;
determining that a user is using the electronic device if the captured image comprises a human facial feature; and
determining that no one is using the electronic device if the captured image does not comprise a human facial feature.

* * * * *